L. R. HARTMAN.
BAKING-PAN.

No. 179,556. Patented July 4, 1876.

Witnesses
Jos. P. Connolly
Anthony Connolly

Inventor
Samuel R. Hartman
By Connolly Bros.
Attorneys

UNITED STATES PATENT OFFICE.

LEMUEL R. HARTMAN, OF CINCINNATI, OHIO.

IMPROVEMENT IN BAKING-PANS.

Specification forming part of Letters Patent No. 179,556, dated July 4, 1876; application filed March 14, 1876.

*To all whom it may concern:*

Be it known that I, LEMUEL R. HARTMAN, of Cincinnati, in the county of Hamilton and State of Ohio, have invented certain new and useful Baking and Roasting Pans; and I do hereby declare the following to be a full, clear, and exact description of the invention, such as will enable others skilled in the art to which it pertains to make and use it, reference being had to the accompanying drawings, which form part of this specification, in which—

Figure 1:
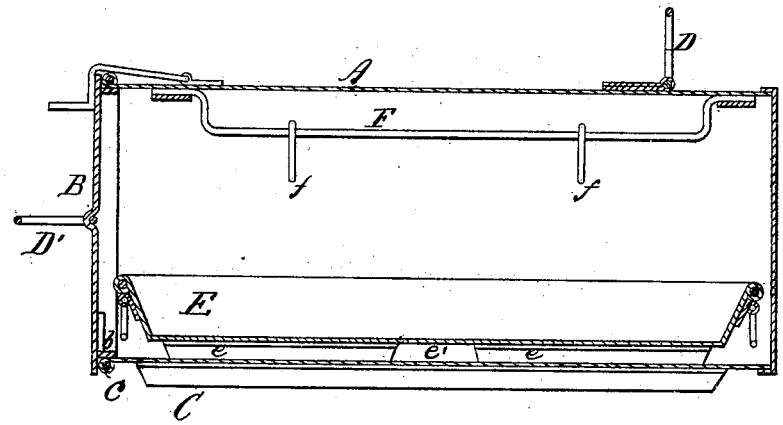
Figure 2:
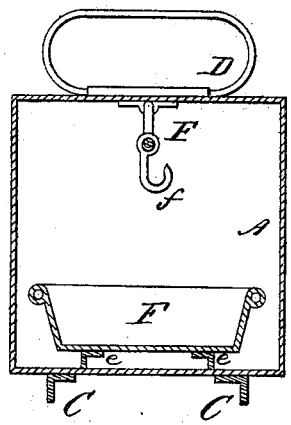

Figure 1 is a vertical longitudinal section, and Fig. 2 is a vertical transverse section, of my improved baking and roasting pan.

This invention has for its object the provision of an improved baking-pan or culinary vessel for general cooking purposes, in which meats, vegetables, bread, pastry, or other articles of food may be effectually baked or roasted, and the disadvantages usually arising from the imperfect distribution of heat in a cooking-stove or oven completely obviated.

This invention involves the principle of a double isolation within the oven of the article to be cooked under conditions which will allow the heat to circulate and surround it freely, and impart to all portions an equal degree thereof, and prevent the evaporation and loss of the flavoring-juices and aromatic properties of the food.

This invention, accordingly, consists in the novel construction of an air-tight box or casing of sheet metal of rectangular form, having isolating flanges or ridges on its under surface to raise it from the bottom of the oven; having also a door hinged to one end, and containing within it a baking or dripping pan, isolated by flanges from the bottom of the box or casing; and also containing a rack with hooks for the suspension of fowl or whatever other article it may be desired to roast while hanging, instead of upon a pan.

Referring to the accompanying drawings illustrating my invention, A designates an oblong rectangular case of suitable capacity, having one end open, and provided with a hinged door, B, upon closing which the case will be rendered practically air-tight. The hinges *b* of the door are attached to the bead-wire *c*, to save labor and expense in manufacturing.

C C are longitudinal flanges or ridges, secured to the bottom of the case A for the purpose of isolating the latter from the bottom of the oven, and allowing the free circulation of the heat.

D D' are handles, attached respectively to the top and door of the case for convenience in handling.

E designates the baking or dripping pan, adapted to fit within the casing A, and provided with isolating ridges or flanges *e* on its under surface to prevent the direct contact of the heated metal of the casing, and allow the free circulation of the heat over and around the contents of said pan. The flanges *e* are divided longitudinally by channels or spaces *e'* for the free passage of the heated currents from side to side underneath the pan. Space is also left for the circulation of heat between the ends of the pan and the end of the case A, as shown.

F represents a rack, consisting of a central longitudinal wire attached to and slightly depending from the upper interior surface of the casing A.

*f f* are sliding hooks, adjustable upon said rack, and adapted to receive and hold whatever it is desired to suspend, so as to isolate it from the walls of the case A.

I am aware that it is not new to inclose an isolated pan in an air-tight case to be inserted in an oven. I do not, therefore, broadly claim an isolated baking-pan, but limit myself to a baking apparatus having the outer case isolated.

Having now described my invention, what I claim as new, and desire to secure by Letters Patent, is—

1. The improved baking and roasting apparatus for ovens, consisting of and comprising the sheet-metal case A, provided with the external isolating bottom flanges C to elevate it from contact with the oven, the hinged door B at one end, and the handles D D', the removable baking-pan E, located within the case A, and provided also with isolating-flanges *e*, elevating it from contact with the case, and the longitudinal suspension-rack F, holding the sliding hooks $f$, all as described and shown, and for the purpose set forth.

2. The combination, with the baking-case A for stoves, of the longitudinal suspension-rack F, holding the sliding hooks $f$, and attached to the upper interior portion of the case, as shown.

In testimony that I claim the foregoing I have hereunto set my hand this 13th day of March, 1876.

LEMUEL R. HARTMAN.

Witnesses:
JOS. B. CONNOLLY,
THOS. A. CONNOLLY.